(12) United States Patent
Abbott

(10) Patent No.: US 8,504,824 B1
(45) Date of Patent: Aug. 6, 2013

(54) ONE-TIME ROTATING KEY FOR THIRD-PARTY AUTHENTICATION

(75) Inventor: Robert L. Abbott, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/551,337

(22) Filed: Jul. 17, 2012

Related U.S. Application Data

(60) Provisional application No. 61/653,206, filed on May 30, 2012.

(51) Int. Cl.
*H04L 29/06* (2006.01)

(52) U.S. Cl.
USPC .............................................. 713/159; 380/44

(58) Field of Classification Search
USPC ............. 726/2, 9; 713/159, 171, 172; 380/44, 380/273
See application file for complete search history.

(56) References Cited

U.S. PATENT DOCUMENTS

2011/0051909 A1* 3/2011 Frederick ................... 379/88.19

* cited by examiner

*Primary Examiner* — Edward Zee
(74) *Attorney, Agent, or Firm* — Michael A. Springs; Moore & Van Allen PLLC; James C. Edwards

(57) ABSTRACT

Systems, methods, and computer program products are provided for secure authentication of third-parties accessing a network system (e.g., a website or the like) through an intermediary entity (i.e., a trusted caller). A session token having a predetermined time-out period (i.e., an expiration time) is implemented in conjunction with a rotating key that is generated for each request and response pair associated with each call/interaction between the third-party entity and the network system. In this regard, the third-party entity must authenticate themselves each time they interact (i.e., call-in) into the network system by presenting the assigned session token and rotating key communicated in response to the previous interaction. As such hijacking of the third-party's network session with the network system is prevented by implementing tokens that expire, in unison with, encrypted rotating keys that are valid only until the next third-party call-in/ interaction with the network entity.

21 Claims, 6 Drawing Sheets

US 8,504,824 B1

ONE-TIME ROTATING KEY FOR THIRD-PARTY AUTHENTICATION

CROSS-REFERENCE TO RELATED APPLICATIONS

This application claims priority to U.S. Provisional Patent Application Ser. No. 61/653,206, filed May 30, 2012, entitled "One-Time Rotating Key for Third Party Authentication," the entirety of which is incorporated herein by reference.

FIELD

In general, embodiments herein disclosed relate to systems, methods, and computer program products for user authentication and, more specifically, implementing a one-time (i.e., single interaction/call) rotating key for authenticating third-parties using a system through an intermediary.

BACKGROUND

Third-party access to a network system is typically accomplished by an intermediary entity initially calling into the network system to request access on behalf of the third-party entity. While the intermediary entity is typically a "trusted caller"; meaning they have been properly authenticated by the network system, the third-party entity is not considered a "trusted caller" by the network system, since the third-party entity is known/authenticated by the intermediary but not by the network system.

As a conventional means of authenticating third-party entities desiring access to network systems via an intermediary entity, the intermediary entity authenticates the third-party and generates a token which provides the third-party entity the ability access to the network system upon presentation of the token.

However, hijacking of tokens is common in communication networks and allows unauthorized entities to gain access to network systems. One such example of malicious use of tokens is Cross-Site Request Forgery (CSRF), also referred to as one-click attack or session riding, in which unauthorized commands are seemingly transmitted from a trusted user to a network entity (e.g., a website). The proliferation of token hijacking and other authentication spoofing techniques means that the network entity cannot infer that the entities, especially third-party entities, are who they purport to be.

Therefore, a need exists to develop methods, systems, computer program products and the like which provide for secure third-party authentication, such that network systems (e.g., websites or the like) can only be accessed by third-party entities that have been provided authorization to access the network system. In addition, the network system can be assured that the third-party entity accessing the network system is, in fact, who they purport to be.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for secure authentication of third-parties accessing a network system (e.g., a website or the like) through an intermediary entity. The present invention not only relies on session tokens having a predetermined time-out period (i.e., an expiration time) but also benefits from a generating a rotating key for every request and response pair associated with each call-in/interaction between the third-party entity and the network system. In this regard, the third-party entity must authenticate themselves each time they interact (i.e., call-in) into the network system by presenting the assigned session token, providing by the intermediary entity, and the rotating key communicated by the network system in response to the previous call-in/interaction. As such hijacking of the third-party's network session with the network system is prevented by implementing session tokens that expire, in unison with, rotating keys that are valid only until the next third-party call-in interaction with the network entity.

A method for authenticating a third-party for access to a network system that comprises a plurality of computing devices each including at least one processor. The processors are configured to perform the steps of receiving, at the network system, a network call from a third-party entity that includes a session token and a first rotating key and authenticating the third-party entity based at least in part on a determination that the session token and the first rotating key are currently stored in memory at the network system. The steps further include providing the third-party access to a network session associated with the network system in response to authenticating the third-party entity and revoking the first rotating key from the memory in response to authenticating the third-party entity. In addition, the steps include generating, and storing in the memory, a second rotating key configured to only provide for authentication of the third-party during a next-in-time network call by the third-party entity to the network system and communicating the second rotating key to the third-party entity.

In alternate embodiments of the method authenticating the third-party further includes authenticating the third-party based on determining that the session token is assigned to the third-party entity.

In further alternate embodiments the method includes the step of resetting a time-out period for storing the session token in the memory based on the authentication of the third-party entity. In such embodiments the method may further include the step of revoking the session token from the memory when a subsequent network call from the third-party entity does not occur within the time-out period.

In other alternate embodiments the method includes the step of encrypting the second rotating key prior to storing the second rotating key in the memory.

In still further alternate embodiments the method includes the steps of receiving, at the network system, a previous network call from the third-party that includes the session token. The previous network call occurs prior to the network call absent any intervening calls. The method further includes assigning the session token to the network session based on verifying that the session token is currently stored in the memory at the network system and verifying that the session token is currently unassigned. In addition the method includes generating, and storing in the memory, the first rotating key, wherein the first rotating key is valid only for authenticating the during the network call (i.e., the next-in-time call) and communicating the first rotating key to the third-party entity.

In related alternate embodiments the method includes the steps of receiving a network session request call from an intermediary entity configured to establish the network session on behalf of the third-party entity. The network session request call includes the session token associated with the third-party entity and generated by the intermediary entity. The method further includes the steps of storing, in the memory, the session token for the time-out period, wherein if the previous network call from the third-party entity does not occur within the time-out period the session token is revoked from the memory.

An apparatus for authenticating third-party entities at a network system, defines second embodiments of the invention. The apparatus includes a network system-based computing platform including a memory and at least one processor in communication with the memory. The apparatus further includes a third-party authentication module stored in the memory and executable by the processor. The third-party authentication module is configured to receive a network call from a third-party entity that includes a session token and a first rotating key and authenticate the third-party entity based at least in part on a determination that the session token and the first rotating key are currently stored in memory at the network system. The third-party authentication module is further configured to provide the third-party access to a network session associated with the network system in response to authenticating the third-party entity and revoke the first rotating key from the memory in response to authenticating the third-party entity. Moreover, the third-party authentication module is configured to generate, and store in the memory, a second rotating key configured to only provide for authentication of the third-party during a next-in-time network call by the third-party entity to the network system and communicating the second rotating key to the third-party entity.

A computer program product that includes a non-transitory computer-readable medium defines third embodiments of the invention. The computer-readable medium includes codes for causing a computing device processor to receive a network call from a third-party entity that includes a session token and a first rotating key and authenticate the third-party entity based at least in part on a determination that the session token and the first rotating key are currently stored in memory at the network system. The computer-readable medium additionally includes codes for causing a computing device processor to provide the third-party access to a network session associated with the network system in response to authenticating the third-party entity and revoke the first rotating key from the memory in response to authenticating the third-party entity. In addition the computer-readable medium additionally includes codes for causing a computing device processor to generate, and store in the memory, a second rotating key configured to only provide for authentication of the third-party during a next-in-time network call by the third-party entity to the network system and communicate the second rotating key to the third-party entity.

Thus, as described in more details below, methods, apparatus and computer program products are defined that provide for secure authentication of third-parties accessing a network system (e.g., a website or the like) through an intermediary entity. The present invention not only relies on token having a predetermined time-out period (i.e., an expiration time) but also benefits from a generating an encrypted rotating key for every request and response pair associated with each interaction between the third-party entity and the network system. In this regard, the third-party entity must authenticate themselves each time they interact (i.e., call-in) into the network system by presenting the assigned token and rotating key communicated in response to the previous interaction.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
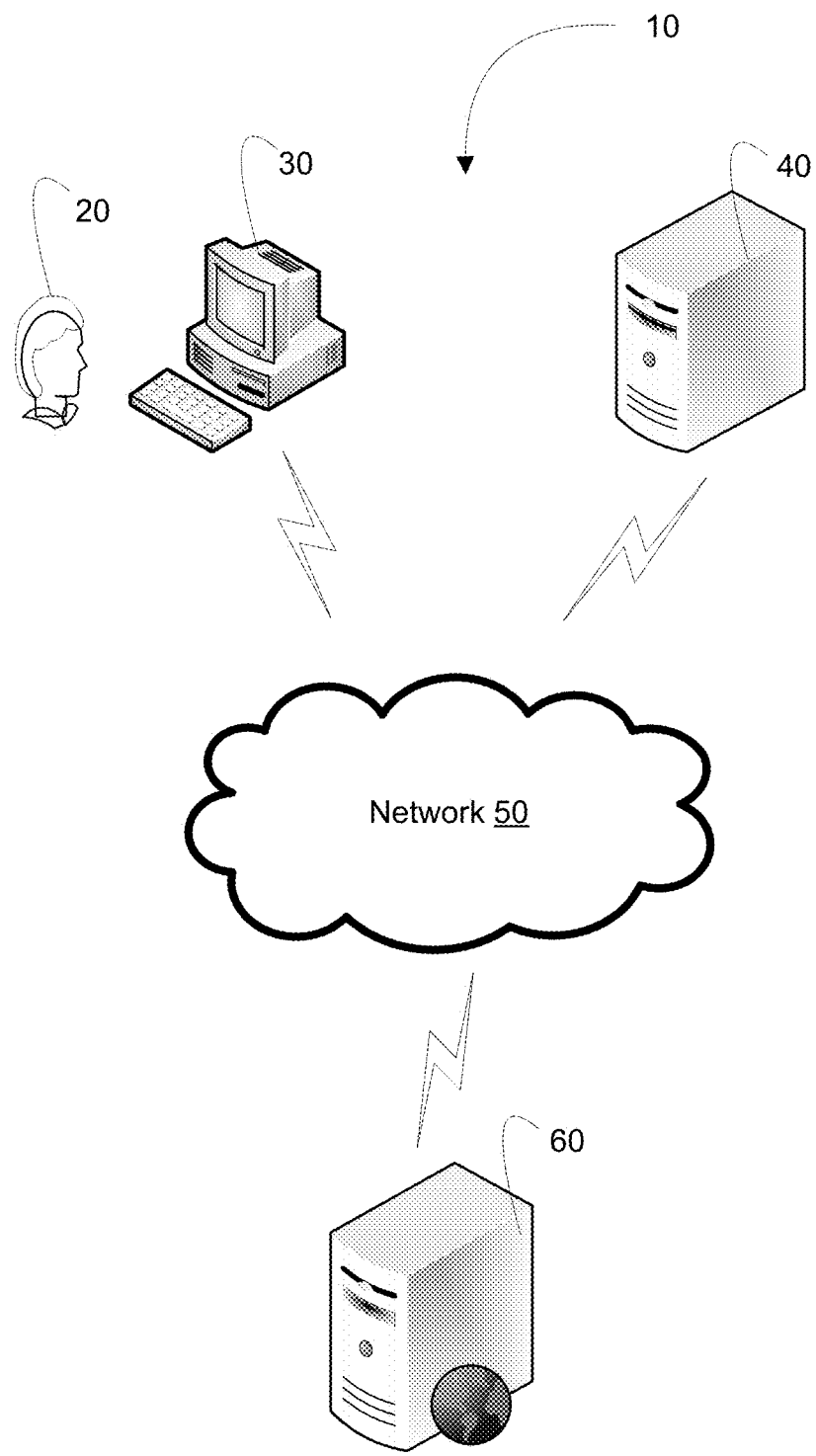
Figure 2:
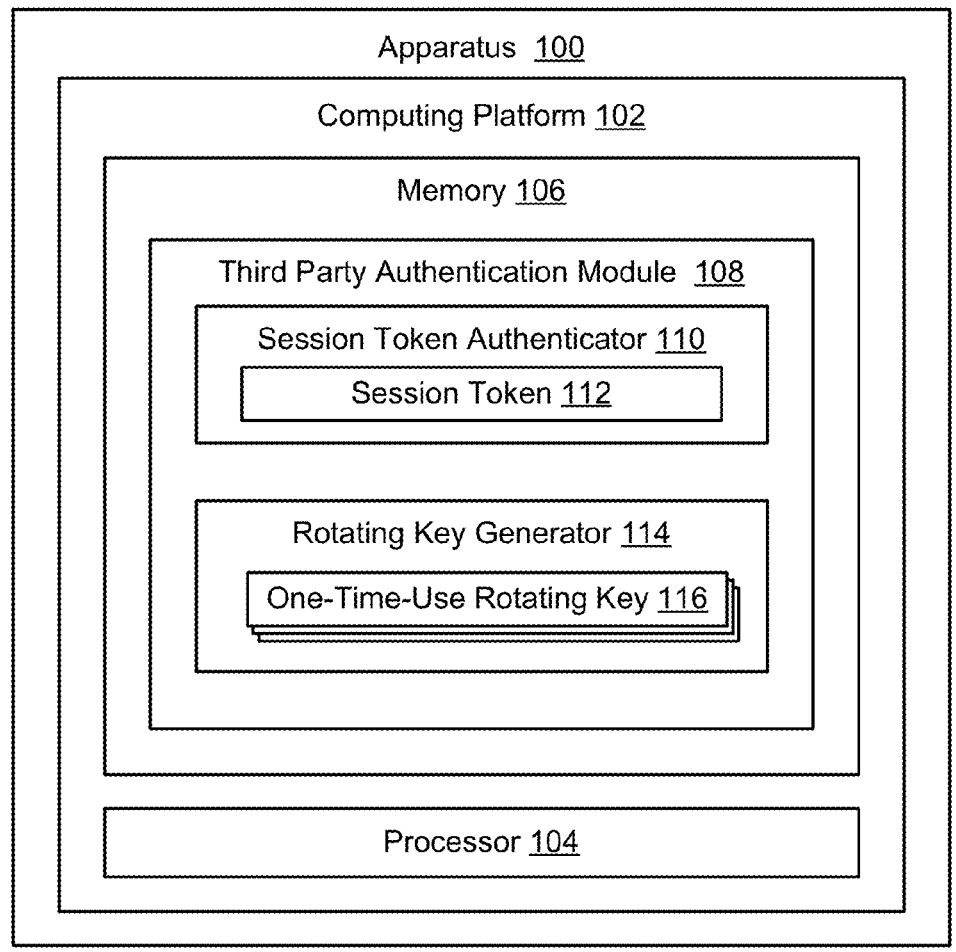
Figure 3:
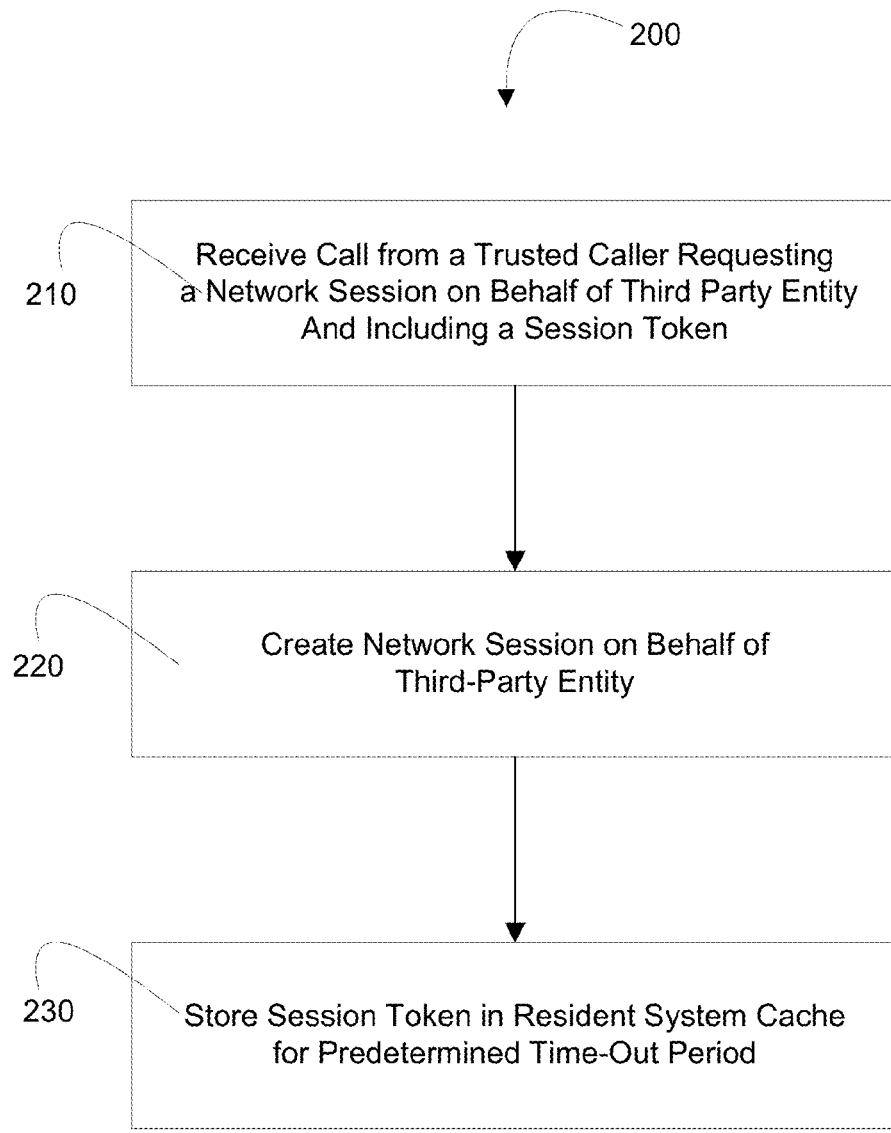
Figure 4:
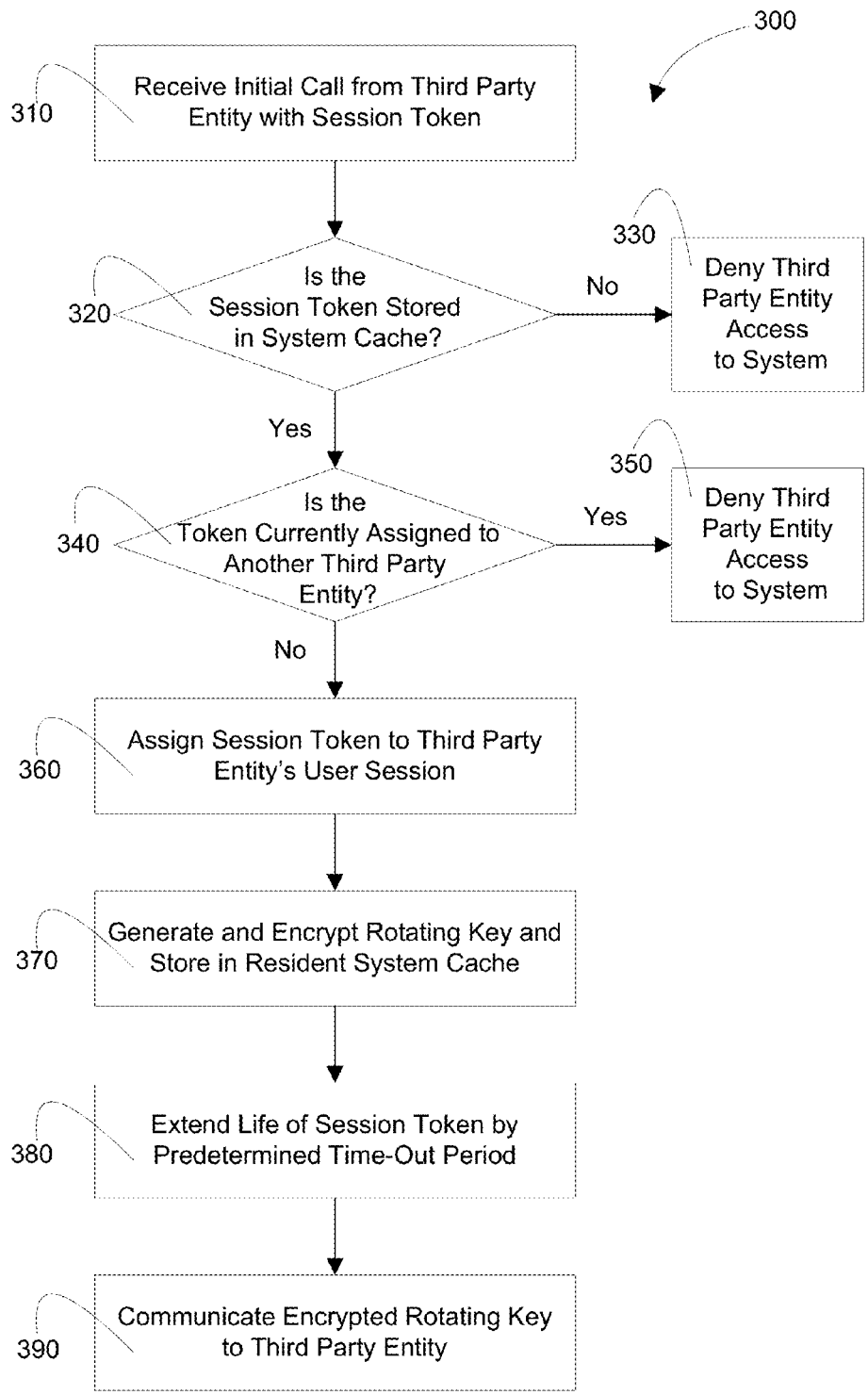
Figure 5:
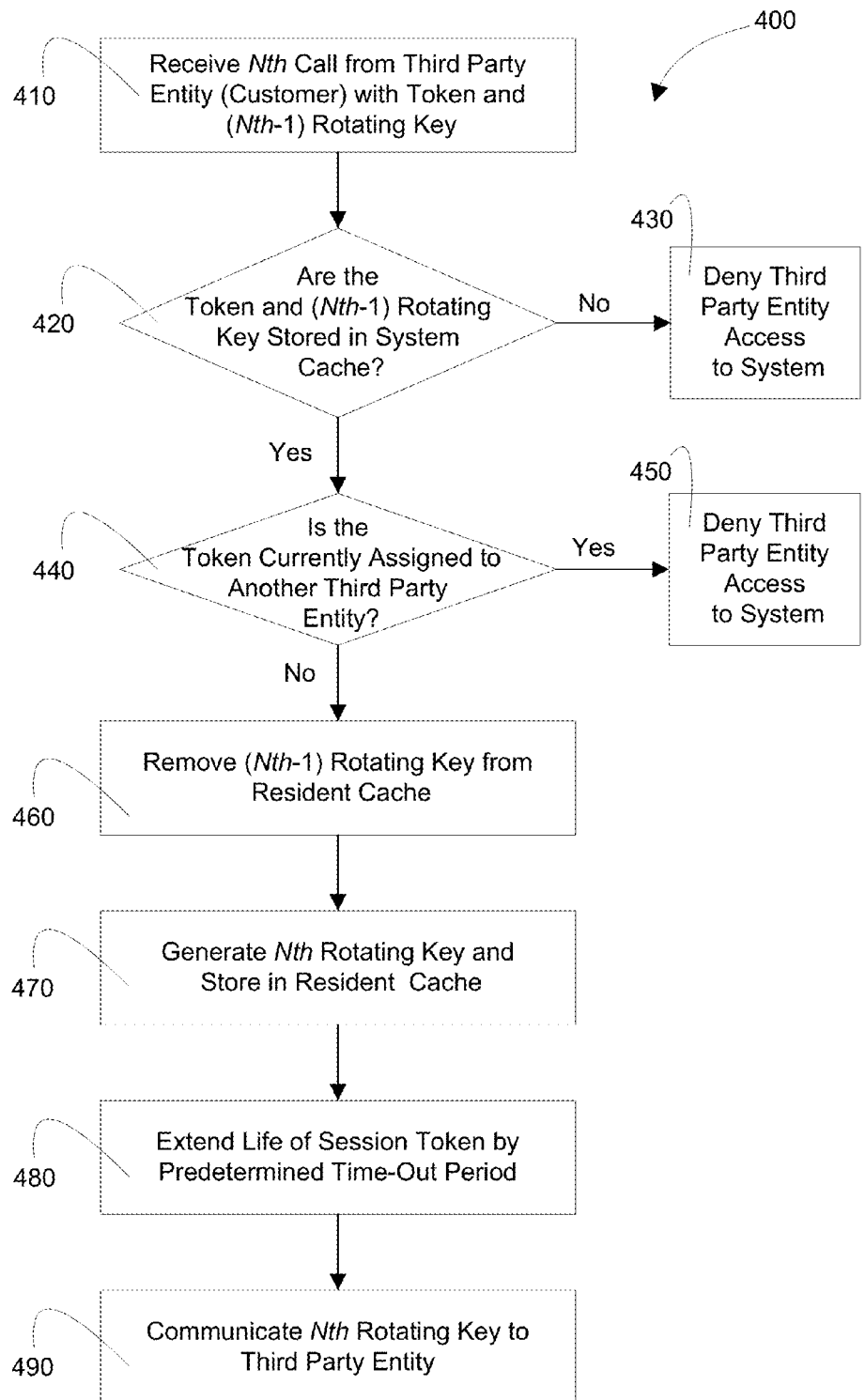
Figure 6:
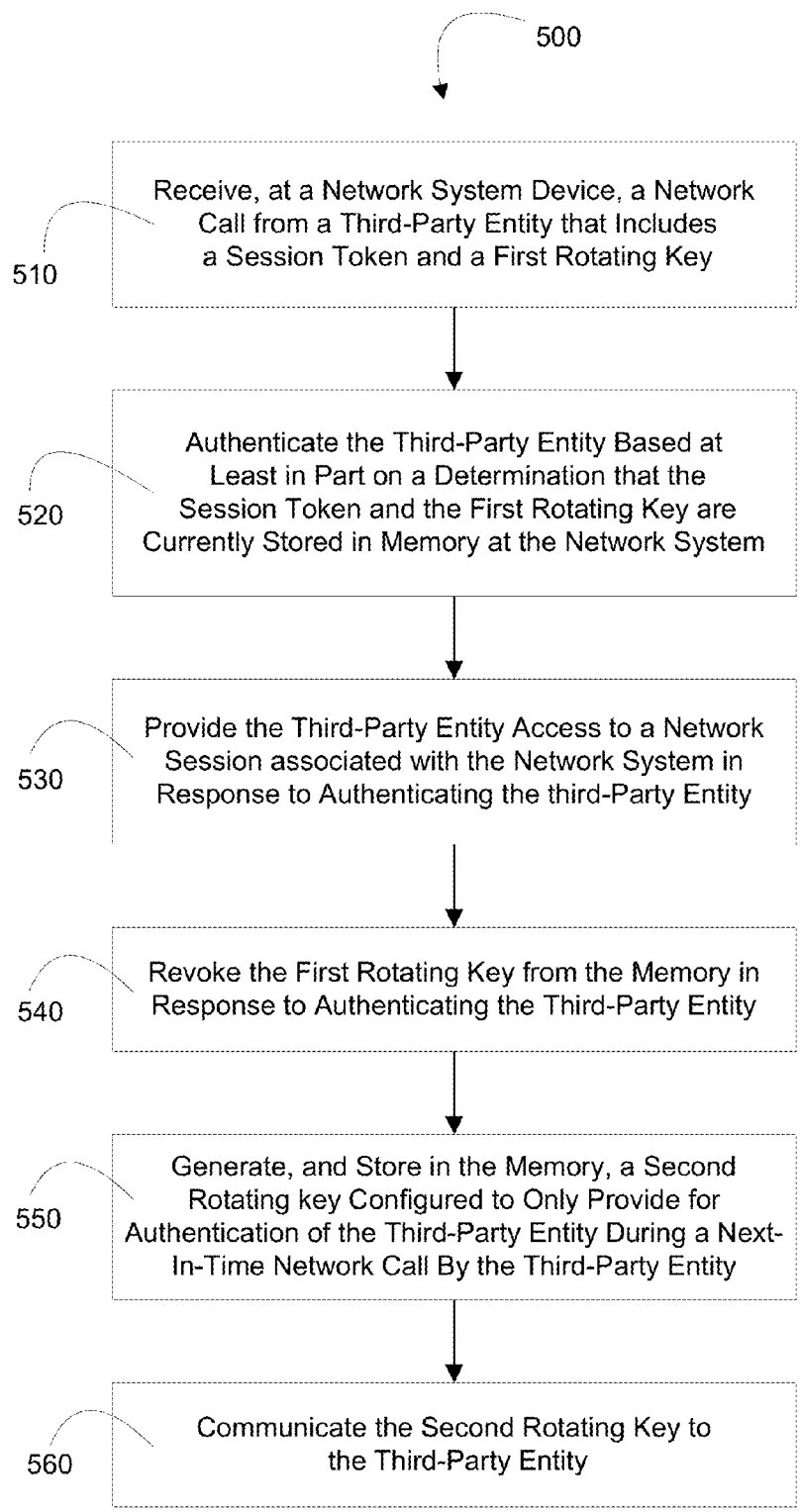

Having thus described embodiments of the invention in general terms, reference will now be made to the accompanying drawings, which are not necessarily drawn to scale, and wherein:

FIG. 1 is a block diagram of a system for providing authentication to a third-party accessing a network system via an intermediary trusted caller, in accordance with one embodiment of the present invention;

FIG. 2 is an apparatus for authentication of third-party entities, in accordance with one embodiment of the present invention;

FIG. 3 is a flow diagram of a method for receiving a third-party entity session request from a trusted caller and generating a session token, in accordance with an embodiment of the present invention;

FIG. 4 is a flow diagram of a method for receiving a first call/interaction on behalf of the third-party entity, verifying the token and generating a rotating key, in accordance with one embodiment of the present invention;

FIG. 5 is a flow diagram of a method for receiving an Nth call/interaction on behalf of the third-party entity, verifying the token and the (Nth−1) rotating key, and generating an Nth rotating key, in accordance with other embodiments of the present invention; and FIG. 6 is a flow diagram of a method for third-party authentication for accessing a network system; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems and computer program products are described in detail herein that provide for secure authentication of third-parties accessing a network system (e.g., a website or the like) through an intermediary entity. The present invention not only relies on session tokens configured to provide for a predetermined time-out period (i.e., an expiration time) but also benefits from generating a rotating key; "rotating" meaning a new value/key is created for every request and response pair associated with each interaction between the third-party entity and the network system. In this regard, the third-party entity must authenticate themselves each time they interact (i.e., call-in) into the network system by presenting the assigned session token, received from the intermediary entity, and the rotating key communicated from the network system in response to the previous interaction. Once the rotating key has been presented by third-party entity during an interaction, the network system revokes/removes the rotating key from memory; eliminating the possibility of future presentation of the rotating key by a non-authorized entity attempting to wrongfully access the network system. As such hijacking of the third-party session with the network system is prevented by implementing session tokens that expire, in unison with, rotating keys that are valid only until the next third-party call-in/interaction with the network system.

Referring to FIG. 1 a block diagram is provided of a system for 10 for third-party entity access to a network system, in accordance with embodiments of the present invention. A user 20, which represents the third-party entity, is in communication with a computing device 30. FIG. 1 depicts computing device 30 as a personal computer, although computing device 30 may be any wired or wireless computing device including a laptop computer, a mobile device (e.g., smartphone) or the like. The user 20, via computing device 30 is in network communication with network device 40 (also referred to herein as a trusted caller). The network 50 may be the Internet, an intranet or the like. Network device 40 may be a server or the like. In one embodiment network device 40 is a financial institution server providing online banking services to user 20. The user 20 may be required to authenticate prior to gaining access to network device 40. Network device 40 and computing device 30 are also in network communication with network system 60, which may be a website server or the like. In order for the user/third-party entity 20 to gain access to the network system 60, network device 40 generates and communicates to the user/third-party entity 20 an authentication token, otherwise referred to herein as a "token".

According to embodiments of the present invention the network device 40 may communicate with the network system 60 to create a network session with the network system 60 on behalf of the user/third-party entity 20. For example, the network system 60 may be an online retailer that delivers offers to the user/third-party entity 20 through the user's affiliation with an online banking application (i.e., network device 30).

For a more detailed discussion of such a system, whereby a user accesses an online or mobile banking application and receives offers, as a third-party entity, from an online retailer, see U.S. patent application Ser. No. 13/529,999, entitled "Intelligent Offer Tool", filed on Jun. 21, 2012, which is assigned to the same inventive entity as the current patent application and is herein incorporated by reference as if set-forth fully herein.

The network device 40 is considered to be a "trusted caller" of the network system 60 and, as such does not require interrogation or further authentication upon call-in. However, the user/third-party entity 20 is not a trusted caller of the network system 60 since the network system 60 is unaware of the identity of the user/third-party entity 20. Thus, in order to grant the user/third-party entity 20 access to the network system 60 the network system 60 requires that the user/third-party entity 20 be duly authenticated. Moreover, according to embodiments of the present invention, the network system 60 provides for such authentication to occur during each interaction/call-in that the user/third-party entity conducts with the network system 60 using an interaction/call-in specific rotating key. Such ongoing third-party authentication is necessary to insure that the authentication credentials granted to the third-party entity have not been nefariously hijacked and used by another entity to wrongly gain access to the network system 60.

FIG. 2 depicts a high level block diagram of an apparatus 100 configured to provide a third-party authentication using one-time rotating keys, in accordance with embodiments of the present invention. The apparatus 100 may comprise one or more computing devices. The apparatus 100 includes a computing platform 102 having one or more processors 104 and a memory 106 in communication with the processor(s) 104. The memory 106 may comprise volatile and non-volatile memory, such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, computing platform 102 also includes processor 104, which may be an application-specific integrated circuit ("ASIC"), or other chipset, processor, logic circuit, or other data processing device. Processor 104 or other processor such as ASIC may execute an application programming interface ("API") (not shown in FIG. 2) that interfaces with any resident programs, such as third-party authentication module 108 or the like stored in the memory 106 of the apparatus 100.

Processor 104 may include various processing subsystems (not shown in FIG. 2) embodied in hardware, firmware, software, and combinations thereof that enable the functionality of apparatus 100 and the operability of the apparatus 100 on a network. For example, processing subsystems allow for initiating and maintaining communications and exchanging data with other networked devices. For the disclosed aspects, processing subsystems of processor 104 may include any subsystem used in conjunction with third-party authentication module 108 or subcomponents or sub-modules thereof.

The memory 106 stores third-party authentication module 108 that is configured to authenticate third-parties that request access to a network system (e.g., website or the like) through an intermediary/trusted caller, in accordance with embodiments of the present invention. The third-party authentication module 108 includes a session token authenticator 110 that is configured to receive a session token 112 from the intermediary and authenticate the third-party, based in part, on presentation of the session token 112 by the third-party each time the third-party interacts/calls-in to the network system. The session token 112 is generated by the intermediary as part of the authentication process conducted between the third-party entity and the intermediary (e.g., customer logging onto an online/mobile banking application or the like) and is based on a third-party identifier (e.g., party ID, customer ID, account ID or the like) communicated by the third-party to the intermediary as part of the aforementioned authentication process.

Upon an initial call-in by the intermediary/trusted caller on behalf of the third-party entity, the intermediary presents the session token 112 to the network system, which stores the session token in resident cache memory. The session token 112 is configured such that it is stored in resident cache for a predetermined period of time (e.g. fifteen minutes), also referred to as a time-out period, such that if the third-party entity does not call back/interact with the network session within the predetermined time period the session token 112 is invalidated (i.e., removed from the resident cache) and the third-party entity must re-authenticate (i.e., obtain a new session token from the intermediary) in order to gain access to the network system. If the third-party entity calls-in/interacts with the network system session using the session token, the predetermined time period is reset, such that the session token 112 will remain in the resident cache for the predetermined time period starting from the last successful (i.e., authenticated) call-in/interaction that the third-party entity has with the network system.

In addition, the third-party authentication module 108 includes a rotating key generator 114 that generates a one-time-use rotating key 116, also referred to as a rotating value or rotating cookie that is dynamically generated and communicated to the third-party each time the third-party entity calls-in/interacts with the network session. The rotating key 116 is then presented by the third-party during the next call-in/interaction, along with the session token 112, as a means of authenticating the third-party entity. Each time an interaction call-in occurs and the rotating key is verified (i.e., presented by the third-party and determined to match the rotating key existing in the resident cache), the rotating key is revoked (i.e., removed) from the resident cache and a new rotating key is generated and communicated to the third-party entity. In specific embodiments, as an added security measure, the one-time-use rotating key 116 is stored in resident cache and communicated to the third-party in an encrypted form and subsequently decrypted by the network system upon presentation of the session token and key during the next-in-time interaction/call-in to the network system. The use of a rotating key 116, in addition to a session token 112, for the purpose of third-party authentication means that a would-be hijacker would have to obtain both the session token and the rotating key and hijack the network session within the timeframe of the third-party entity's next call-in/interaction, since the rotating key 116 is only valid for authenticating the third-party for their next-in-time call-in/interaction.

Referring to FIG. 3 a flow diagram is presented of a method 200 for initiating a network session by a trusted caller/intermediary on behalf of a third-party, in accordance with embodiments of the present invention. At Event 210, a network system, such as a website or the like, receives a call from a trusted caller, requesting a network session for a third-party entity. As previously noted, in one embodiment the network system may be an online retailer website, the trusted caller may be an online/mobile banking application and the third-party entity may be an online or mobile banking customer.

The request for the network session made by the trusted caller includes a session token, which was previously generated by the trusted caller and communicated to the third-party entity based on the third-party entity being authenticated to access the intermediary entity. As previously noted, the session token is generated based on third-party identifying information (e.g., a customer identifier (ID), account number (ID) or the like) provided by the customer/third-party entity during authentication between the customer/third-party entity and the intermediary/trusted caller. As previously noted, the session token is presented by the third-party entity each time they access the network system as one part of the third-party entity authentication.

At Event 220, based on receipt of the request for the network session, the network session is created on behalf of the third-party entity. At Event 230, the session token is stored by the network system in resident cache memory for a predetermined period of time (otherwise referred to as the "time to live"). Once the predetermined period of time (e.g., fifteen minutes or the like) has expired and the third-party has not called-in/interacted with the network session, the session token will be inactivated (i.e., revoked from the resident cache). Once inactivated, the third-party caller will be required to re-authenticate (i.e., obtain a new session token from the intermediary/trusted caller) prior to accessing the network system/establishing a network session. As shown in the flow diagram of FIG. 4, if the third-party entity calls-in/interacts with the network session during the predetermined time period, the life of the session token will be extended by the predetermined time period or any other designated time period. As such, the session token will only be active for up to the predetermined time period beyond the last call-in/interaction that the third-party conducts with the network system.

Referring to FIG. 4 a flow diagram is presented of a method 300 for initial third-party call-in/interaction with a network system using the session token and generation of the initial rotating key, in accordance with embodiments of the present invention. At Event 310, the network system receives an initial call-in/interaction from the third-party entity, which includes presentation of the session token. As previously noted the third-party entity will have received the session token from the intermediary entity as part of the third-party's authentication process with the intermediary.

At Decision 320, a determination is made as whether the session token is currently stored in resident cache. As previously noted the session token will have been previously received from the trusted caller and resides in the resident cache only for a predetermined period of time. Thus, if the predetermined period of time lapses, the session token will have been removed from the resident cache. In other instances, the session token presented may not be the one stored in the resident cache (i.e., an unauthorized third-party is attempting to gain access with a counterfeit token). If the session token is determined to not currently be stored in the resident cache, at Event 330, the third-party is denied access to the network system/network session. Denial of access requires that the third-party re-authenticate (i.e., obtain a new session token from the intermediary entity/trusted caller).

If the session token is determined to be currently stored in resident cache then, at Decision 340, a determination is made as to whether the session token is currently assigned to another third-party entity. If the session token is currently assigned to another network session, the caller may have hijacked the session token and is trying to gain unauthorized access to the network system/network session. If the session token is currently assigned to another third-party, at Event 350, the third-party is denied access to the network system/network session.

If the session token is not currently assigned to another third-party, at Event 360, the session token is assigned to the third-party entity's network session. It should be noted that if a third-party caller is determined to be an invalid caller, the session token is removed from resident cache, thus, requiring a subsequent valid caller to re-authenticate (i.e., obtain a new session token from the intermediary entity/trusted caller).

At Event 370, a rotating key is generated and, optionally, encrypted. The rotating key is subsequently stored in resident cache. At Event 380, the life of the session token is extended by resetting for resident cache storage time by the initial predetermined time period or some other predetermined time period. For example, if the predetermined time period is fifteen minutes, the initial call-in/interaction by the third-party entity serves to extend the life of the session token by fifteen minutes.

At Event 390, the rotating key, optionally encrypted, is communicated to the third-party entity and will be presented by the third-party entity, along with the session token, during the next-in-time, call-in/interaction with the network session.

Referring to FIG. 5 a flow diagram is depicted of a method 400 for receive an Nth call (i.e., any call beyond the initial call) from the third-party entity and authenticating the third-party, in accordance with embodiments of the present invention. At Event 410, the network system receives the Nth call-in/interaction from the third-party entity, which includes presentation of the session token and the (Nth-1) rotating key, which was communicated in response to the previous third-party call-in/interaction with the network session.

At Decision 420, a determination is made as whether the session token and the (Nth-1) rotating key are currently stored in resident cache. As previously noted, the session token resides in the resident cache only for a predetermined period of time and the (Nth-1) rotating key is stored in the resident cache for this specific call-in interaction (i.e., the next call-in/interaction following the call-in interaction during which the (Nth-1) rotating key was generated and communicated to the third-party entity). If the session token or the rotating key is determined to not currently be stored in the resident cache, at Event 430, the third-party is denied access to the network system/network session. Denial of access requires that the third-party re-authenticate (i.e., obtain a new session token) with the intermediary/trusted caller.

If the session token and rotating key are determined to be currently stored in resident cache then, at Decision 440, a determination is made as to whether the session token is currently assigned to another third-party entity. If the session token is currently assigned to another third-party, at Event 450, the third-party is denied access to the network system/network session.

If the session token is not currently assigned to another third-party, at Event 460, the (Nth-1) rotating key is revoked from the resident cache and, at Event 470, an Nth rotating key is generated, optionally encrypted, and stored in the resident cache of the network system. At Event 480, the life of the session token is reset/extended by the initial predetermined period of time or some other predetermined period of time. At Event 490, the Nth rotating key is communicated to the third-party entity, and will be presented by the third-party entity, along with the session token, as a means of authentication, during the third-party entity's next-in-time, call-in/interaction with the network session.

FIG. 6 is a flow diagram of a method 500 for third-party authentication for access to a network system, in accordance with embodiments of the present invention. At Event 510, the network system receives a network call from a third-party entity that includes a session token and a first rotating key. The session token will have been previously communicated to the third party entity from an intermediary entity and the first rotating key will have previously been communicated to the third-party entity as a response to a last-in-time network call by the third party entity to the network system.

At Event 520, the third-party entity is authenticated based at least in part on a determination that the session token and the first rotating key are currently stored in network system memory. In addition, the authentication may be based on a determination that the session token has been previously assigned to the third party entity. In those embodiments in which the first rotating key is stored as an encrypted rotating key the stored rotating key and the rotating key received from the third-party entity may be decrypted prior to comparing the keys to determine if they are the same rotating key.

At Event 530, the third party entity is provided access to a network session associated with the network system in response to authenticating the third-party entity. At Event 540, the first rotating key is revoked (i.e., removed) from the memory in response to authenticating the third-party entity. Revocation of the rotating key from the memory ensures that an unauthorized caller who may possess the rotating key may not present the key for authentication/access in the future.

At Event 540, a second rotating key is generated and stored in the memory. The second rotating key is configured to only provide authentication to the third-party entity during a next-in-time network call by the third-party entity to the network system. At Event 550, the second rotating key is communicated to the third party entity, such that, the third-party entity will present the second rotating key during the next-in-time network call, along with the session token, as a means of authenticating the third-party entity during the next-in-time network call.

In addition, the time-out period for storing the session token in the memory may be reset based on authentication of the third-party entity. The time-out period is initially set when the network system receives a network session request from the intermediary entity, requesting the session on behalf of the third party entity. Such a request includes the session token. The time-out period defines the length of time in which the session token will remain in network memory, once the time-out period expires the session token is revoked from the network system memory and the third-part entity is required to re-authenticate with the intermediary entity (i.e., obtain a new session token) prior to accessing the network system via a subsequently established new network session.

In alternate embodiments the method 500 of FIG. 6 may include the steps of receiving a previous (i.e., initial) network call from the third-party that includes the session token. The previous network call occurred prior to the network call absent any intervening calls. The method further includes assigning the session token to the network session based on verifying that the session token is currently stored in the memory at the network system and verifying that the session token is currently unassigned. The method further includes generating, and storing in the network system memory, the first rotating key and communicating the first rotating key to the third-party entity. The first rotating key is valid only for authenticating the during the network call (i.e., the next-in-time network call by the third-party entity to the network system.

Thus, as described in above, methods, apparatus and computer program products are defined that provide for secure authentication of third-parties accessing a network system (e.g., a website or the like) through an intermediary entity. The present invention relies on session token having a predetermined time-out period (i.e., an expiration time) and use of a rotating key, generated for every request and response pair associated with each call-in/interaction between the third-party entity and the network system. In this regard, the third-party entity must authenticate themselves each time they interact (i.e., call-in) with the network system by presenting the assigned session token and rotating key communicated in response to the previous call-in/interaction.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating third-party entities, the system comprising:
   a network based computing platform including a first memory and at least one processor in communication with the first memory; and
   a third-party authentication module stored in the first memory, executable by the processor and configured to:
      receive a network call from a third-party entity that includes a session token and a first rotating key;
      authenticate the third-party entity based at least in part on a determination that the session token and the first rotating key are currently stored in network memory;
      provide the third-party access to a network session in response to authenticating the third-party entity;
      revoke the first rotating key from the network memory in response to authenticating the third-party entity;
      generate, and store in the network memory, a second rotating key configured to only provide for authentication of the third-party during a next-in-time network call by the third-party entity to the network system; and
      communicate the second rotating key to the third-party entity.

2. The system of claim 1, wherein the third-party authentication module is further configured to authenticate the third-party based on determining that the session token is assigned to the third-party entity.

3. The system of claim 1, wherein the third-party authentication module is further configured to reset a time-out period for storing the session token in the network memory based on the authentication of the third-party entity.

4. The system of claim 3, wherein the third-party authentication module is further configured to revoke the session token from the network memory when a subsequent network call from the third-party entity does not occur within the time-out period.

5. The system of claim 1, wherein the third-party authentication module is further configured to encrypt the second rotating key prior to storing the second rotating key in the network memory.

6. The system of claim 1, wherein the third-party authentication module is further configured to:
   receive a previous network call from the third-party that includes the session token, wherein the previous network call occurs prior to the network call absent any intervening calls;
   assign the session token to the network session based on verifying that the session token is currently stored in the network memory and verifying that the session token is currently unassigned;
   generate, and store in the network memory, the first rotating key, wherein the first rotating key is valid only for authenticating the during the network call; and
   communicate the first rotating key to the third-party entity.

7. The system of claim 6, wherein the third-party authentication module is further configured to:
   receive a network session request call from an intermediary entity configured to establish the network session on behalf of the third-party entity, wherein the network session request call includes the session token associated with the third-party entity; and store, in the network memory, the session token for the time-out period, wherein if the previous network call from the third-party entity does not occur within the time-out period the session token is revoked from the network memory.

8. A method for third-party authentication within a network system, the method comprising the steps of:
receiving, at the network system, a network call from a third-party entity that includes a session token and a first rotating key;
authenticating, by a computing device processor, the third-party entity based at least in part on a determination that the session token and the first rotating key are currently stored in a memory at the network system;
providing, by a computing device processor, the third-party entity access to a network session associated with the network system in response to authenticating the third-party entity;
revoking, by a computing device processor, the first rotating key from the memory in response to authenticating the third-party entity;
generating, by a computing device processor, and storing in the memory, a second rotating key configured to only provide for authentication of the third-party entity during a next-in-time network call by the third-party entity to the network system; and
communicating, by a computing device processor the second rotating key to the third-party entity.

9. The method of claim 8, wherein authenticating the third-party entity further comprises authenticating, by the computing device processor, the third-party entity based on determining that the session token is assigned to the third-party entity.

10. The method of claim 8, further comprising resetting, by a computing device processor, a time-out period for storing the session token in the memory based on the authentication of the third-party entity.

11. The method of claim 10, further comprising revoking, by a computing device processor, the session token from the memory when a subsequent network call from the third-party entity does not occur within the time-out period.

12. The method of claim 8, further comprising the step of encrypting, by a computing device processor, the second rotating key prior to storing the second rotating key in the memory.

13. The method of claim 8, further comprising the steps of:
receiving, at the network system, a previous network call from the third-party entity that includes the session token, wherein the previous network call occurs prior to the network call absent any intervening calls;
assigning, by a computing device processor, the session token to the network session based on verifying that the session token is currently stored in the memory at the network system and verifying that the session token is currently unassigned;
generating, by a computing device processor, and storing in the memory, the first rotating key, wherein the first rotating key is valid only for authenticating during the network call; and
communicating, by a computing device processor, the first rotating key to the third-party entity.

14. The method of claim 13, further comprising the steps of:
receiving a network session request call from an intermediary entity configured to establish the network session on behalf of the third-party entity, wherein the network session request call includes the session token associated with the third-party entity; and
storing, in the memory, the session token for the time-out period, wherein if the previous network call from the third-party entity does not occur within the time-out period the session token is revoked from the memory.

15. A computer program product, comprising:
a non-transitory computer-readable medium comprising codes for causing at least one computing device processor to:
receive a network call from a third-party entity that includes a session token and a first rotating key;
authenticate the third-party entity based at least in part on a determination that the session token and the first rotating key are currently stored in memory within a network system;
provide the third-party entity access to a network session associated with the network system in response to authenticating the third-party entity;
revoke the first rotating key from the memory in response to authenticating the third-party entity;
generate, and store in the memory, a second rotating key configured to only provide for authentication of the third-party entity during a next-in-time network call by the third-party entity to the network system; and
communicate the second rotating key to the third-party entity.

16. The computer program product of claim 15, wherein the non-transitory computer-readable medium further comprises codes for causing the at least one computing device processor to authenticate the third-party entity based on determining that the session token is assigned to the third-party entity.

17. The computer program product of claim 15, wherein the non-transitory computer-readable medium further comprises codes for causing the at least one computing device processor to reset a time-out period for storing the session token in the memory based on the authentication of the third-party entity.

18. The computer program product of claim 17, wherein the non-transitory computer-readable medium further comprises codes for causing the at least one computing device processor to revoke the session token from the memory when a subsequent network call from the third-party entity does not occur within the time-out period.

19. The computer program product of claim 15, wherein the non-transitory computer-readable medium further comprises codes for causing the at least one computing device processor to encrypt the second rotating key prior to storing the second rotating key in the memory.

20. The computer program product of claim 15, wherein the non-transitory computer-readable medium further comprises codes for causing the at least one computing device processor to:
receive a previous network call from the third-party entity that includes the session token, wherein the previous network call occurs prior to the network call absent any intervening calls;
assign the session token to the network session based on verifying that the session token is currently stored in the memory at the network system and verifying that the session token is currently unassigned;
generate, and store in the memory, the first rotating key, wherein the first rotating key is valid only for authenticating the during the network call; and
communicate the first rotating key to the third-party entity.

21. The computer program product of claim 20, wherein the non-transitory computer-readable medium further comprises codes for causing the at least one computing device processor to:
- receive a network session request call from an intermediary entity configured to establish the network session on behalf of the third-party entity, wherein the network session request call includes the session token associated with the third-party entity; and
- store, in the memory, the session token for the time-out period, wherein if the previous network call from the third-party entity does not occur within the time-out period the session token is revoked from the memory.

* * * * *